United States Patent
Sharma et al.

(10) Patent No.: US 9,510,257 B2
(45) Date of Patent: Nov. 29, 2016

(54) OPPORTUNISTIC, LOCATION-PREDICTIVE, SERVER-MEDIATED PEER-TO-PEER OFFLOADING

(71) Applicant: QUALCOMM Incorporated, San Diego, CA (US)

(72) Inventors: Sandeep Sharma, San Diego, CA (US); Mohammed Ataur Rahman Shuman, San Diego, CA (US); Amit Goel, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 160 days.

(21) Appl. No.: 14/632,276

(22) Filed: Feb. 26, 2015

(65) Prior Publication Data
US 2016/0255562 A1    Sep. 1, 2016

(51) Int. Cl.
| | |
|---|---|
| H04W 24/00 | (2009.01) |
| H04W 36/24 | (2009.01) |
| H04L 29/08 | (2006.01) |
| H04W 4/02 | (2009.01) |
| H04W 76/02 | (2009.01) |

(52) U.S. Cl.
CPC .............. *H04W 36/24* (2013.01); *H04L 67/06* (2013.01); *H04L 67/104* (2013.01); *H04L 67/1063* (2013.01); *H04L 67/2809* (2013.01); *H04L 67/325* (2013.01); *H04W 4/02* (2013.01); *H04W 76/023* (2013.01)

(58) Field of Classification Search
CPC ... H04W 36/24; H04W 76/023; H04W 4/02; H04L 67/104; H04L 67/325; H04L 67/06; H04L 67/2809; H04L 67/1063
See application file for complete search history.

(56) References Cited

U.S. PATENT DOCUMENTS

| | | | |
|---|---|---|---|
| 6,748,233 B1 * | 6/2004 | Arnold | H04W 52/22 455/456.3 |
| 8,560,236 B1 | 10/2013 | Zahir et al. | |
| 8,594,061 B2 | 11/2013 | Kennedy et al. | |
| 8,653,967 B1 * | 2/2014 | Vosburgh | B63B 22/18 340/3.1 |
| 2004/0043772 A1 * | 3/2004 | Quirke | H04W 28/18 455/456.1 |
| 2007/0002765 A1 * | 1/2007 | Kadaba | H04L 12/5695 370/254 |
| 2008/0002658 A1 | 1/2008 | Soliman | |
| 2010/0323715 A1 * | 12/2010 | Winters | G01S 5/0027 455/456.1 |
| 2011/0207489 A1 * | 8/2011 | DeLuca | H04W 72/1205 455/509 |

(Continued)

FOREIGN PATENT DOCUMENTS

| | | |
|---|---|---|
| WO | 2014062699 A1 | 4/2014 |
| WO | 2014182935 A1 | 11/2014 |

OTHER PUBLICATIONS

International Search Report and Written Opinion—PCT/US2016/013682 ISA/EPO—Apr. 26, 2016.

*Primary Examiner* — Clemence Han
(74) *Attorney, Agent, or Firm* — Muncy, Geissler, Olds & Lowe, P.C.

(57) ABSTRACT

Systems and methods are disclosed for optimizing data transfers. The method may include receiving a request to transfer data between a wireless device and a data transfer target, wherein the requested data transfer is associated with a time sensitivity window (TSW), determining whether an opportunity for a peer-to-peer (P2P) data transfer will arise during the TSW, targeting a transfer time from within the TSW for performing the requested data transfer based on the opportunity determination, and transmitting transfer notification data to the wireless device, wherein the transfer notification data includes the targeted transfer time.

30 Claims, 10 Drawing Sheets

(56) References Cited

U.S. PATENT DOCUMENTS

| | | | |
|---|---|---|---|
| 2011/0317631 A1* | 12/2011 | Navda | H04W 72/1231 370/329 |
| 2012/0064908 A1* | 3/2012 | Fox | H04W 28/10 455/452.2 |
| 2014/0099967 A1 | 4/2014 | Egner et al. | |
| 2014/0105083 A1 | 4/2014 | Krishnaswamy et al. | |
| 2014/0162687 A1 | 6/2014 | Edge | |
| 2015/0120087 A1* | 4/2015 | Duan | H04L 67/12 701/1 |
| 2015/0141058 A1* | 5/2015 | Shim | G01S 5/0027 455/456.3 |
| 2016/0037379 A1* | 2/2016 | Shafiee | H04W 28/0268 370/230.1 |
| 2016/0142510 A1* | 5/2016 | Westphal | H04L 67/322 709/219 |

\* cited by examiner

OPPORTUNISTIC, LOCATION-PREDICTIVE, SERVER-MEDIATED PEER-TO-PEER OFFLOADING

BACKGROUND OF THE INVENTION

Aspects of this disclosure relate to wireless communications systems. In particular, aspects of this disclosure relate to offloading network infrastructure communication to peer-to-peer (P2P) communication between endpoints in a server-mediated manner.

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Exemplary cellular systems include the cellular Analog Advanced Mobile Phone System (AMPS), digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies. More recently, Long Term Evolution (LTE) has been developed as a wireless communications protocol for mobile phones and other terminals to communicate data at high speeds. LTE is based on GSM, and includes contributions from various GSM-related protocols such as Enhanced Data rates for GSM Evolution (EDGE) and Universal Mobile Telecommunications System (UMTS) protocols such as High-Speed Packet Access (HSPA).

Accordingly, communications systems and devices are becoming increasingly diverse with new technological advancements. Communications devices are now able to support various different communications technologies and protocols. Indeed, not only can various communications devices operate in a communications system (e.g., over a network infrastructure), many communications device may communicate with one another using direct peer-to-peer (P2P) communications and/or using infrastructure elements where devices communicate through signals communicated via one or more base stations, access points, or other network infrastructure entities. For example, communications devices that support the Wi-Fi Direct standard or Bluetooth Low Energy (BTLE) standard may connect to each other via direct P2P connections. Furthermore, the LTE Direct (LTE-D) standard uses licensed spectrum and the LTE physical layer to provide a scalable and universal framework through which equipped communications devices can discover and connect to proximate peers and thereby establish direct P2P connections within ranges up to one mile. Wi-Fi direct tends to require the devices to be in closer proximity (approximately 200 meters) and BTLE even closer proximity (approximately 30 feet).

LTE-D operates on licensed spectrum as a service to mobile applications. LTE-D enables service layer discovery. Mobile applications on LTE-D devices can instruct LTE-D to set a monitor for mobile application services on other devices. Moreover, mobile applications on LTE-D devices can announce their own services for detection by other LTE-D devices at the physical layer. The applications can be closed while LTE-D works continuously, and notifies the client application when it detects a match to the set monitor.

LTE-D is thus an attractive alternative to mobile developers seeking to deploy proximate discovery solutions as extensions of their existing cloud services. LTE-D is a distributed discovery solution (versus the centralized discovery that exists today), whereby mobile applications forego centralized database processing in identifying relevancy matches, instead autonomously determining relevance at the device level by transmitting and monitoring for relevant attributes. LTE-D offers certain benefits in terms of privacy as well as power consumption, in that LTE-D does not utilize perpetual location tracking to determine proximity. By keeping discovery on the device rather than in the cloud, the user has more control of what information is shared with external devices.

As noted above, one or more intermediate base stations, access points, or other infrastructure elements typically facilitate communication between two or more wireless devices or other endpoints over a network infrastructure (e.g., through uplink and downlink channels between the endpoints and the infrastructure elements). However, at times, the loading conditions on the infrastructure elements (e.g., at a base station serving one or more wireless devices), may become excessive and thereby degrade communications quality. Furthermore, in certain cases, direct P2P communication may be faster, more efficient, more private, or otherwise advantageous to end users. Accordingly, in view of the above discussion, it should be appreciated that a need exists for systems that can determine appropriate conditions where traffic between two or more wireless devices seeking to communicate can be offloaded from a network infrastructure to direct P2P communications.

SUMMARY

In one aspect, the present disclosure provides a method for a server to optimize data transfers. The method may comprise, for example, receiving a request to transfer data between a wireless device and a data transfer target, wherein the requested data transfer is associated with a time sensitivity window (TSW), determining whether an opportunity for a peer-to-peer (P2P) data transfer will arise during the TSW, targeting a transfer time from within the TSW for performing the requested data transfer based on the opportunity determination, and transmitting transfer notification data to the wireless device, wherein the transfer notification data includes the targeted transfer time.

In another aspect, the present disclosure provides an apparatus for optimizing data transfers. The apparatus may comprise a memory and a processor. The processor may, for example, receive a request to transfer data between a wireless device and a data transfer target, wherein the requested data transfer is associated with a TSW, determine whether an opportunity for a P2P data transfer will arise during the TSW, target a transfer time from within the TSW for performing the requested data transfer based on the opportunity determination, and transmit transfer notification data to the wireless device, wherein the transfer notification data includes the targeted transfer time.

In another aspect, the present disclosure provides another apparatus for optimizing data transfers. The apparatus may comprise, for example, means for receiving a request to transfer data between a wireless device and a data transfer target, wherein the requested data transfer is associated with a TSW, means for determining whether an opportunity for a P2P data transfer will arise during the TSW, means for targeting a transfer time from within the TSW for performing the requested data transfer based on the opportunity determination, and means for transmitting transfer notification data to the wireless device, wherein the transfer notification data includes the targeted transfer time.

In another aspect, the present disclosure provides a computer-readable medium comprising code, which, when executed by a processor, causes the processor to perform operations for optimizing data transfers. The computer-readable medium may comprise, for example, code for receiving a request to transfer data between a wireless device and a data transfer target, wherein the requested data transfer is associated with a TSW, code for determining whether an opportunity for a P2P data transfer will arise during the TSW, code for targeting a transfer time from within the TSW for performing the requested data transfer based on the opportunity determination, and code for transmitting transfer notification data to the wireless device, wherein the transfer notification data includes the targeted transfer time.

DETAILED DESCRIPTION

Figure 1:
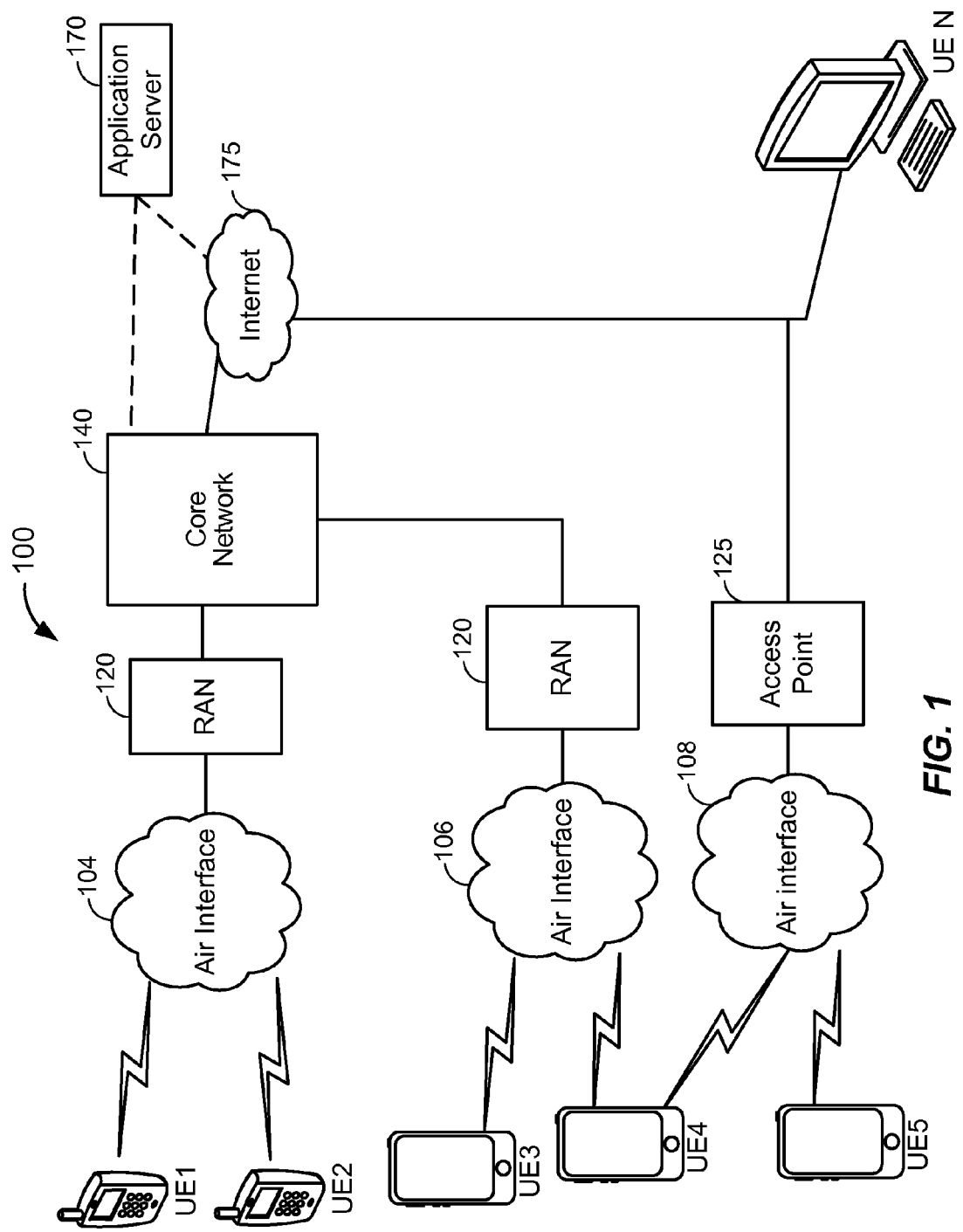
FIG. 1 illustrates a high-level system architecture of a wireless communications system in accordance with an aspect of the disclosure.

Various aspects are disclosed in the following description and related drawings to show specific examples relating to exemplary embodiments. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, Wi-Fi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse traffic channel or a downlink/forward traffic channel.

FIG. 1 illustrates a high-level system architecture of a wireless communications system 100 according to one aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EV-DO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, Evolved Node Bs (eNodeBs or eNBs), and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of Wi-Fi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., a Wi-Fi router with wired and/or wireless connectivity may correspond to the access point 125).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services for UEs that can connect to the application server 170 via the core network 140 and/or the Internet 175 (e.g., Voice-over-Internet Protocol (VoIP) sessions, Voice-over-LTE (VoLTE) sessions, Push-to-Talk (PTT) sessions, group communication sessions, sessions that involve Rich Communication Services (RCS) sessions, social networking services, etc.).

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2:
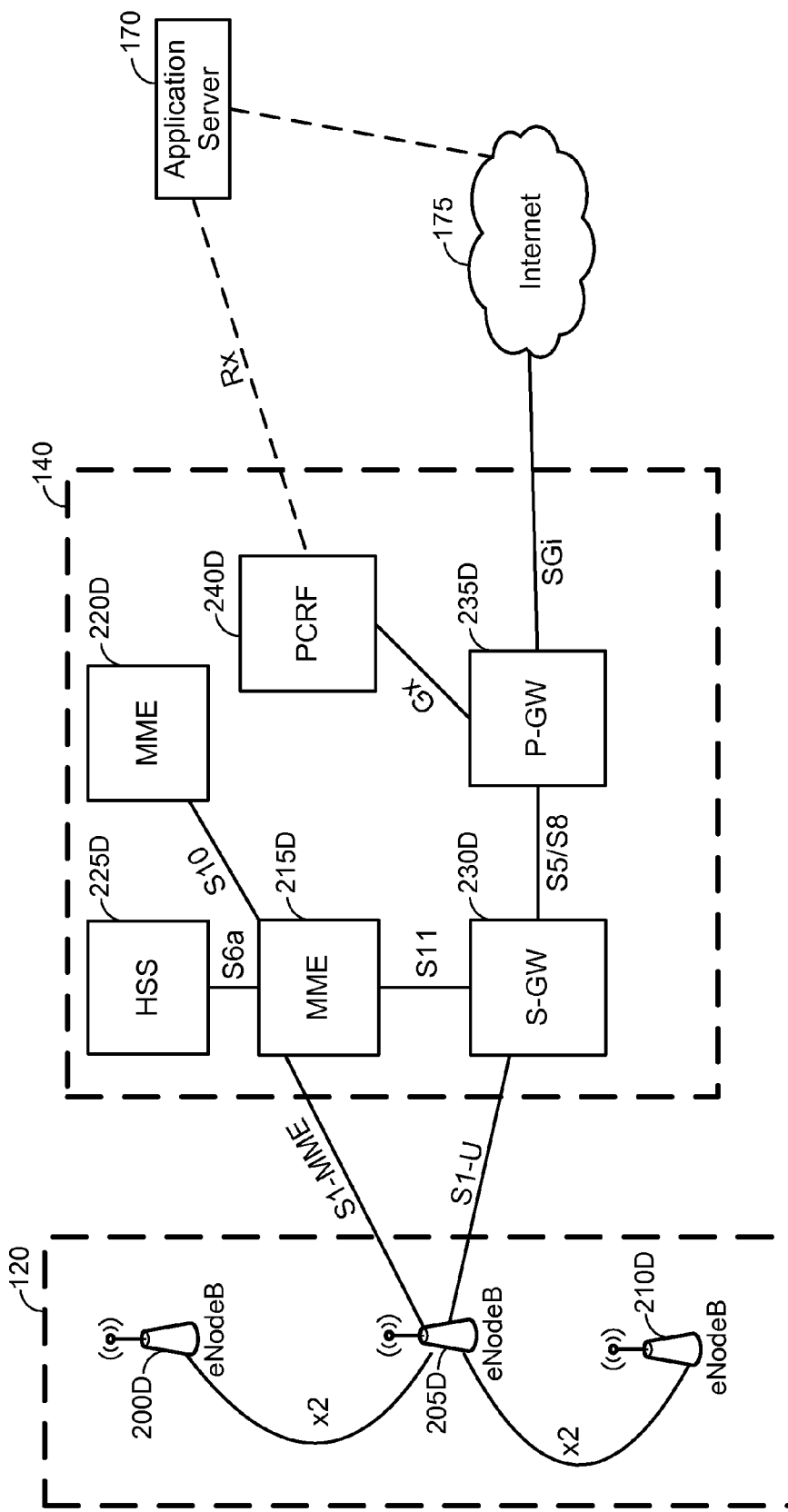
FIG. 2 illustrates an example configuration of the RAN and a packet-switched portion of the core network that is based on an Evolved Packet System (EPS) or Long Term Evolution (LTE) network in accordance with an aspect of the disclosure.

FIG. 2 illustrates an example configuration of the RAN 120 and a packet-switched portion of the core network 140 based on an Evolved Packet System (EPS) or LTE network, according to one aspect of the disclosure. The eNodeBs in EPS/LTE networks do not require a separate controller within the RAN 120 to communicate with the core network 140.

In FIG. 2, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2 and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |

TABLE 1-continued

EPS/LTE Core Network Connection Definitions

| Network Interface | Description |
| --- | --- |
| S11 | Reference point between MME 215D and S-GW 230D. |
| SGi | Reference point between the P-GW 235D and the packet data network, shown in FIG. 2 as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2 will now be described. However, these components are each well-known in the art from various 3GPP TS standards, and the description contained herein is not intended to be an exhaustive description of all functionalities performed by these components.

Referring to FIG. 2, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E UTRAN-capable UEs using any of E UTRAN, GERAN, or UTRAN. The P-GW 235D provides PDN connectivity to E UTRAN capable UEs using E UTRAN only over the S5/S8 interface.

Referring to FIG. 2, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network subsystem. The AF uses the Rx reference point to provide session information to the PCRF 240D. Any other application server offering IP data services over cellular network can also be connected to the PCRF 240D via the Rx reference point.

Figure 3:
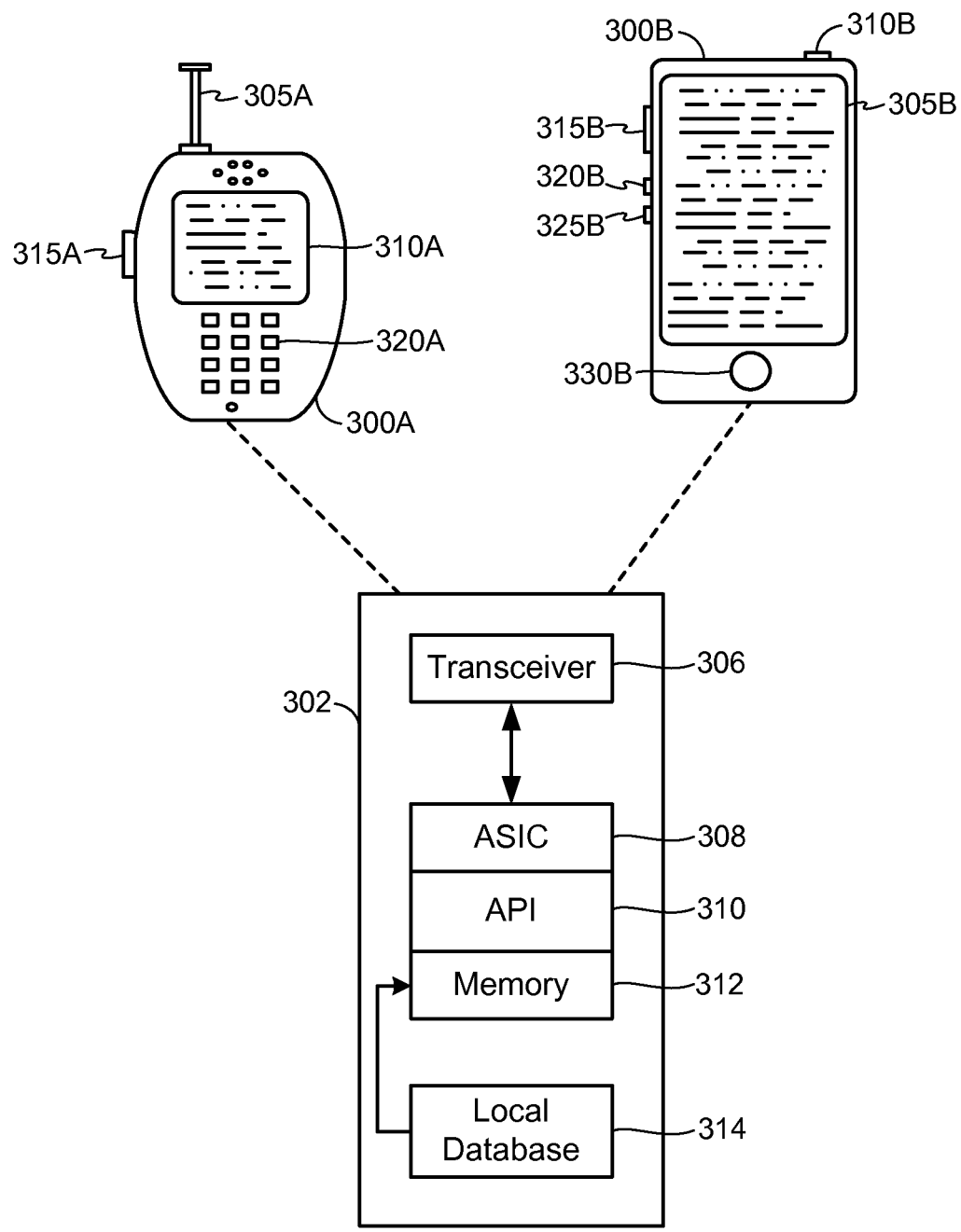
FIG. 3 illustrates examples of user equipments (UEs) in accordance with aspects of the disclosure.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
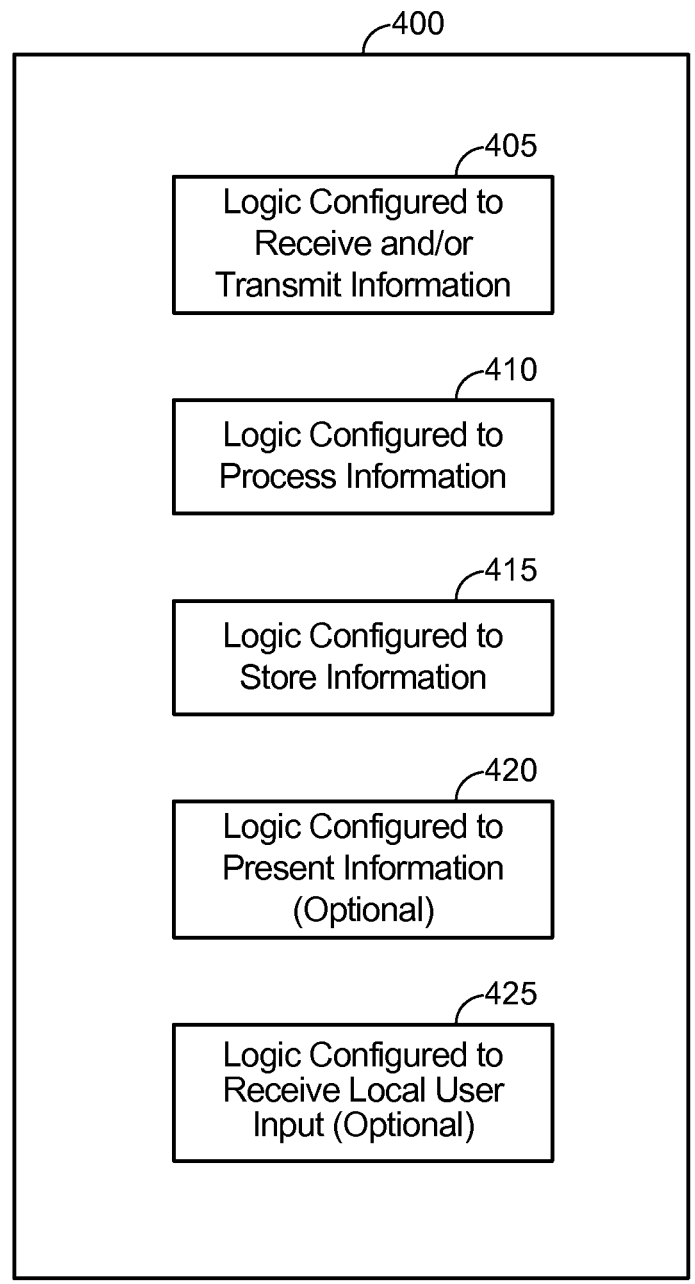
FIG. 4 illustrates a communication device that includes logic configured to perform functionality in accordance with an aspect of the disclosure.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., eNodeBs 200 through 210, etc.), any component of the core network 140 (e.g., MME 215 or 220, HSS 225, S-GW 230, P-GW 235, PCRF 240), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of eNodeBs 200 through 210, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
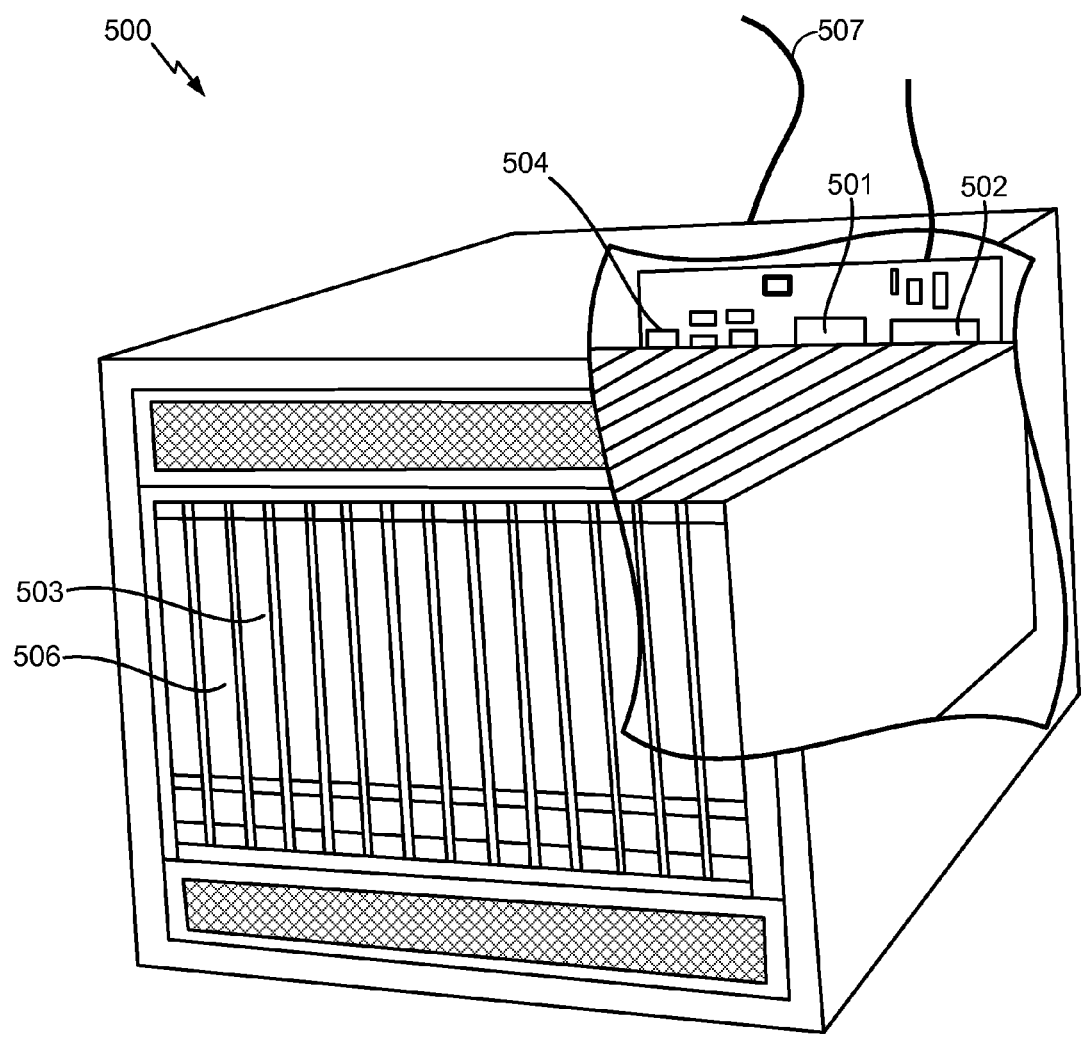
FIG. 5 illustrates a server in accordance with an aspect of the disclosure.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

Figure 6:
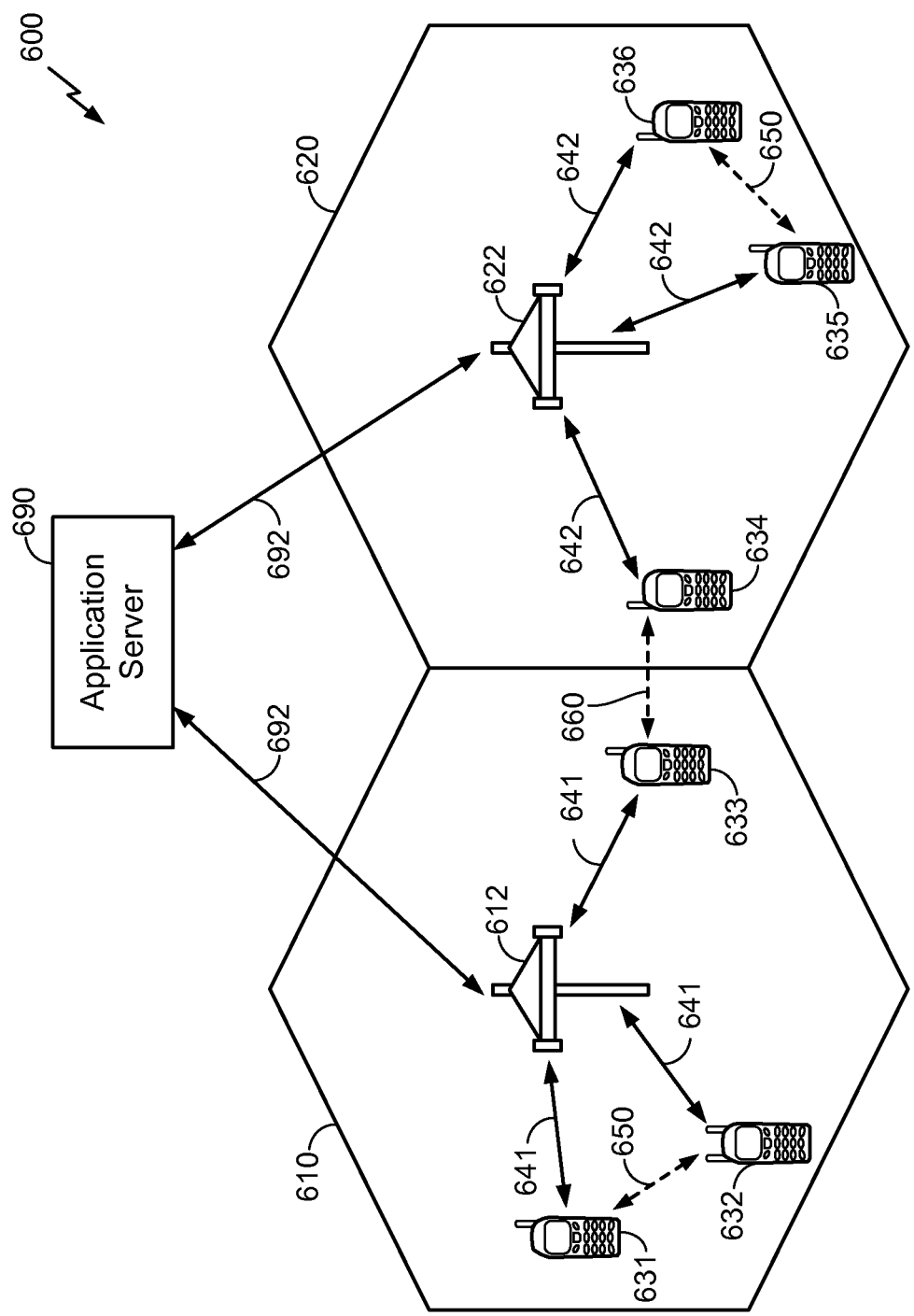
FIG. 6 illustrates a communications environment in which UEs can communicate using P2P technology.

FIG. 6 illustrates a wireless communications system 600 whereby a given UE can either connect directly to other UEs using P2P technology (e.g., LTE-D, WiFi Direct, Bluetooth, etc.) or connect to a Wireless Wide Area Network, such as, for example, an LTE network. Referring to FIG. 6, an application server 690 (e.g., the application server 170 in FIG. 1, FIG. 2, etc.) is connected to a first cell 610 having a first base station 612, a second cell 620 having a second base station 622, and the application server 690 coupled to the first base station 612 and the second base station 622 via a network link 692 (e.g., the Rx link of FIG. 2, etc.). The radio access area, or coverage area, of a given base station is represented by the cell in which the given base station is located, whereby for purposes of discussion, the first cell 610 includes the coverage area corresponding to the first base station 612 and the second cell 620 includes the coverage area corresponding to the second base station 622. Each the cells 610, 620 in the wireless communications system 600 include various UEs that communicate with the respective base stations 612, 622 and with the application server 690 via the respective base stations 612, 622. For example, in the embodiment illustrated in FIG. 6, the first cell 610 includes UE 631, UE 632, and UE 633, while the second cell 620 includes UE 635, UE 636, and UE 634, wherein one or more of the UEs in the wireless communications system 600 may be mobile or other wireless devices. Although not shown in FIG. 6, in some embodiments the base stations 612, 622 may be connected to one another via a backhaul link.

In accordance with various exemplary embodiments described herein, one or more of UE 631, UE 632, UE 633, UE 635, UE 636, and UE 634 may support direct P2P communications, e.g., D2D communications, whereby such UEs may support communicating with one another directly without having to communicate through another device or a network infrastructure element such as the first base station 612 and the second base station 622 and also support communications through the network infrastructure elements such as the first base station 612 and/or the second base station 622. In communications that involve network infrastructure, signals may generally be transmitted and received through uplink and downlink connections between various UEs and the base stations 612, 622, such as link 641 in the first cell 610 and link 642 in the second cell 620. Each of the base stations 612, 622 generally serve as the attachment point for the UEs in the corresponding cells 610, 620 and facilitate communications between the UEs served therein. In accordance with one aspect, when two or more UEs, such as UE 631 and UE 632, wish to communicate with one another and are located in sufficient proximity to each other, then a direct P2P link can be established there between, which may offload traffic from the base station 612 serving the UEs 631, 632, allow UEs 631, 632 to communicate more efficiently, or provide other advantages that will be apparent to those skilled in the art.

As shown in FIG. 6, the UE 631 can communicate with UE 632 through intermediate base station 612 via link 642, and UEs 631, 632 may further communicate via a P2P link 650. Similarly, UEs 635, 636 may communicate through intermediate base station 622 via link 642, and further communicate via a P2P link 650. Furthermore, for inter-cell communications where the participating UEs are in different nearby cells, a direct P2P communications link is still a possibility, which is illustrated in FIG. 6 where UE 633 and UE 634 may communicate using direct P2P communications illustrated by P2P link 660.

In one possible scenario, P2P link 650 and P2P link 660 are D2D links utilizing LTE-D technology. LTE-D is a proposed 3GPP Release 12 D2D solution for proximate discovery. LTE-D dispenses with location tracking and network calls by directly monitoring for services on other LTE-D devices within a large range (for example, ~500 m, line of sight). It does so continuously in a synchronous system that is battery efficient, and can concurrently detect thousands of services in proximity. LTE-D has a wider range than other D2D P2P technologies, such as Wi-Fi Direct or BTLE.

Figure 7A:
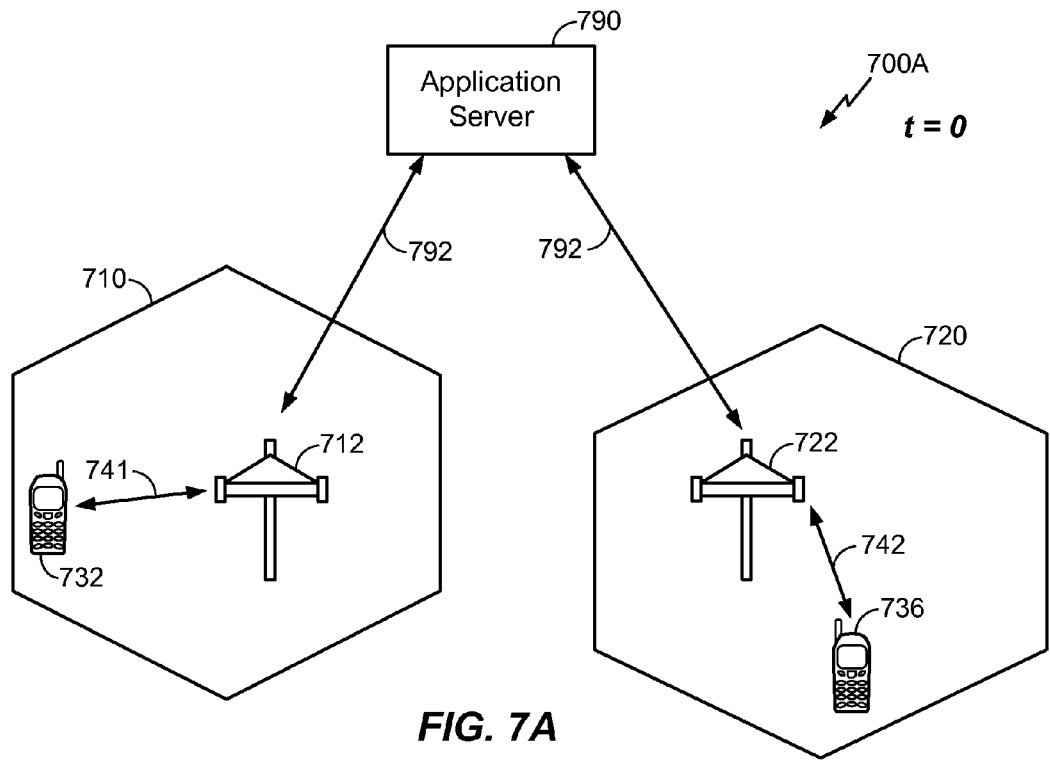
FIG. 7A illustrates a communication environment at a first time in which a first UE and a second UE can not transfer data using P2P technology.
Figure 7B:
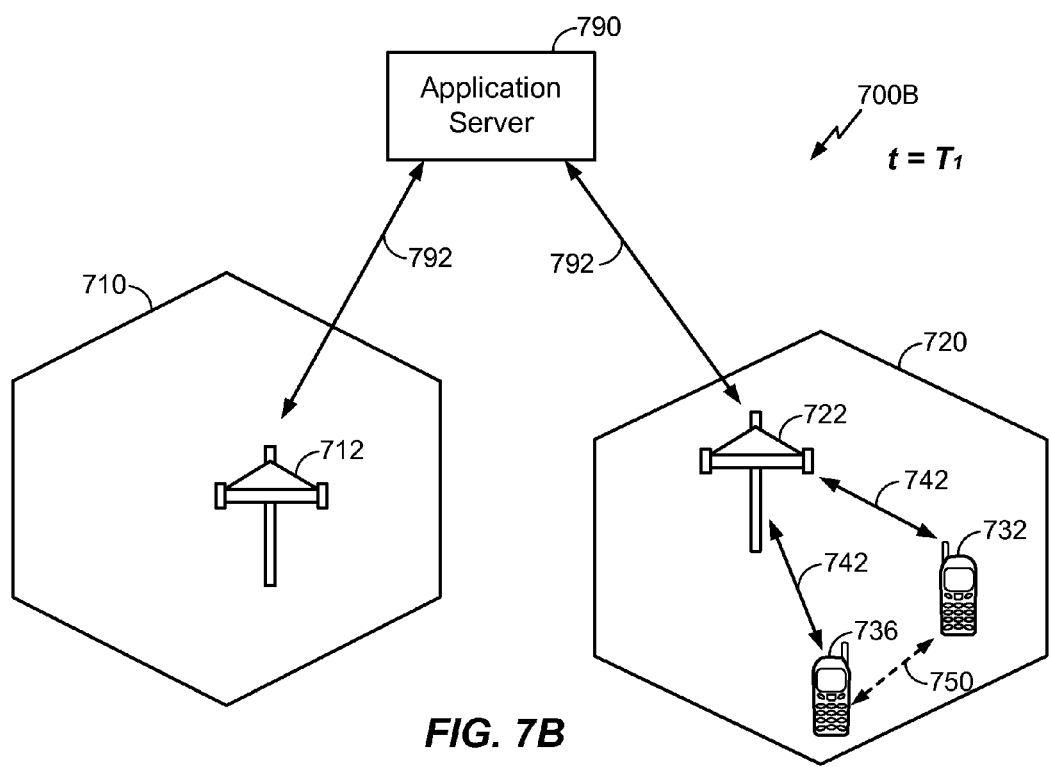
FIG. 7B illustrates a communication environment at a second time in which the first UE from FIG. 7A and the second UE from FIG. 7A can transfer data using P2P technology.

FIG. 7A and FIG. 7B generally illustrate a scenario for the advantageous application of opportunistic, location-predictive P2P offloading techniques. FIG. 7A depicts a time in which P2P offloading is not available (for example, a present time where t=0), and FIG. 7B relates to a later time in which P2P offloading is available (for example, a later time where $t=T_1$).

FIG. 7A depicts a wireless communications system 700A at a time t=0. System 700A comprises an application server 790 connected via a network link 792 to cells 710 and 720 having respective base stations 712 and 722. These components may be similar to analogous components depicted in FIG. 6 (respectively, application server 690, network link 692, and cells 610 and 620 having respective base stations 612 and 622). FIG. 7A also depicts additional analogous components, in particular, UE 732 (located in cell 710 and connected to base station 712 via link 741) and UE 736 (located in cell 720 and connected to base station 722 via link 742. According to an example of the operation of system 700A, the UE 732 attempts to perform a data transfer to UE 736 at time t=0. At time t=0, the target of the data transfer, UE 736, is not available for communication via a direct P2P connection (e.g., P2P link 650 as is depicted in FIG. 6). Therefore, the UE 732 will perform the data transfer to the target of the data transfer UE 736 by transmitting the data to the base station 712 via link 741. The base station 712 relays the data to base station 722 via, e.g., application server 790 or a network as depicted in FIG. 1. The base station 722 then relays the data to the target of the data transfer, UE 736, via link 742.

FIG. 7B depicts a wireless communication system 700B at a time $t=T_1$. System 700B depicts the same components as FIG. 7A. However, at time $t=T_1$ in FIG. 7B, UE 732 is no longer present within cell 710. Instead, UE 732 has relocated to a position in which it can communicate with UE 736 via a P2P link 750. P2P link 750 may be analogous to the P2P link 650 depicted in FIG. 6. According to an example of the operation of system 700B, the UE 732 attempts to perform a data transfer to UE 736 at time $t=T_1$. At time $t=T_1$, the target of the data transfer, UE 736, is available for communication via P2P link 750.

Under certain circumstances, a transfer of data from UE 732 to UE 736 at time $t=T_1$ (using P2P link 750, as depicted in FIG. 7B) may be preferable to transfer of data at time t=0 (using link 741, link 742, and additional necessary network links, as depicted in FIG. 7A). As a result, the possibility of opportunistic P2P data offloading arises.

Figure 8:
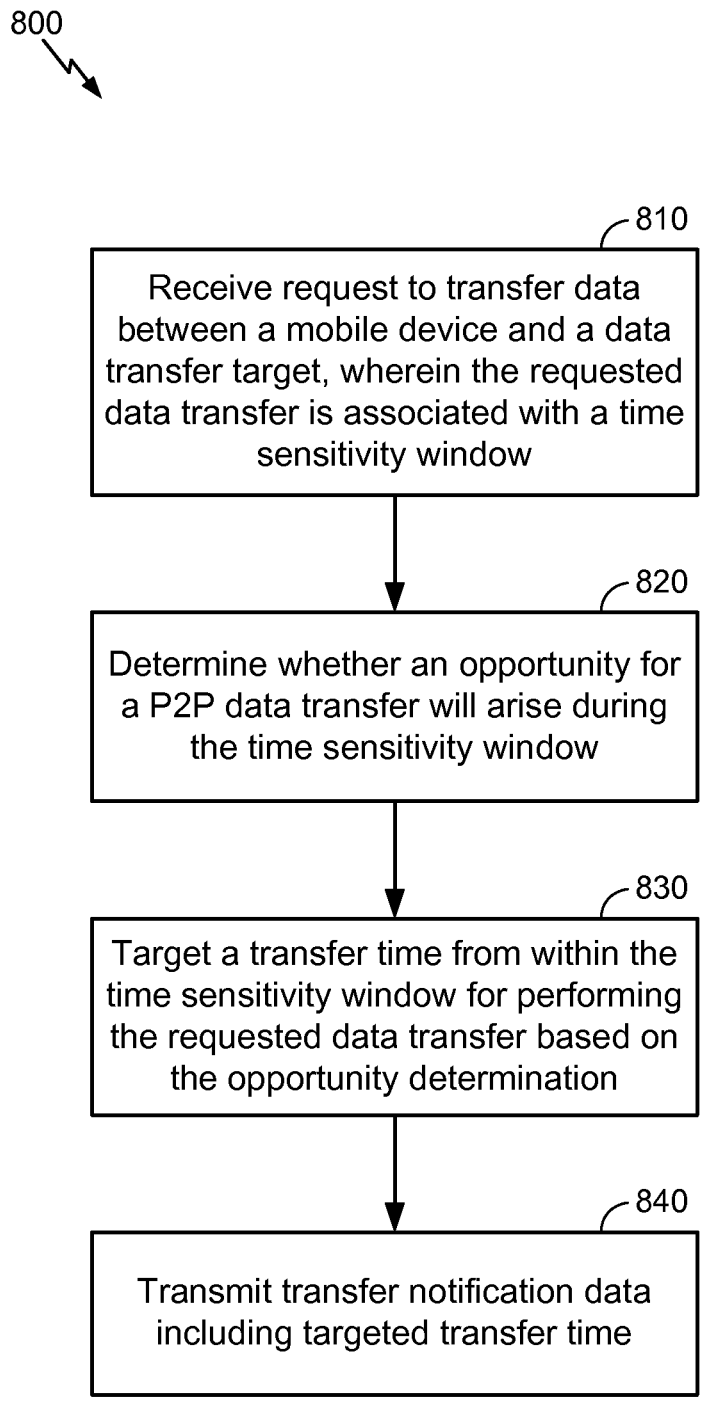
FIG. 8 illustrates a method of optimizing data transfers in accordance with an aspect of the disclosure.

FIG. 8 generally illustrates a method 800 for optimizing data transfers. The method 800 may be performed by a server, for example, application server 790 depicted in FIG. 7A and FIG. 7B.

At 810, the server receives a request to transfer data between a wireless device and a data transfer target. The wireless device and data transfer target may be analogous to, for example, UE 732 and UE 736, respectively, as shown in FIG. 7A and FIG. 7B. However, it will be understood that the wireless device need not be a UE or a mobile device, and may in fact be a static entity. Moreover, the data transfer target need not be a UE or a mobile device, and may in fact be a static entity. However, for the purposes of illustration, the wireless device and data transfer target may be referred to as UE 732 and UE 736, respectively. The data transfer requested at 810 is associated with a time sensitivity window (hereinafter, "TSW"). The TSW may be defined as a duration of time within which the requested data transfer must be completed. For example, the TSW may begin at a present time t=0 and extend to an end time t=$T_E$, wherein end time $T_E$ is a time before which the requested data transfer must be completed.

At 820, the server determines whether an opportunity for a P2P data transfer will arise during the TSW. For example, the application server 790 may estimate that at time $T_1$ a P2P link 750 will be available for the transfer of data between UE 732 and UE 736, as depicted in FIG. 7B. The server may further determine that $T_1 < T_E$ (i.e., that time $T_1$ is within the TSW).

At 830, the server targets a transfer time from within the TSW for performing the requested data transfer based on the opportunity determination. For example, the application server 790 may target $T_1$ as a target time for performing the requested data transfer. The targeting may be based on, for example, the certainty of the estimate that P2P link 750 will be available at time $T_1$, the power savings or network load reduction associated with the P2P link 750, or other consideration set forth in the present disclosure.

At 840, the server transmits transfer notification data that includes the targeted transfer time. For example, the transfer notification data may comprise an instruction for the UE 732 to delay transmission of data until the target time $T_1$. Alternatively, the transfer notification data may comprise a request for permission to delay the transmission of data until the target time $T_1$. In either case, the transfer notification data may further identify the target time $T_1$, the data to be transferred, or any other data relating to the estimates or assumptions described above in relation to the method 800. The transfer notification data may be sent to the same wireless device from which the data transfer request was received at 810 (for example, UE 732). Additionally or alternatively, the transfer notification data may be sent to the target of the requested data transfer (for example, UE 736).

Figure 9:
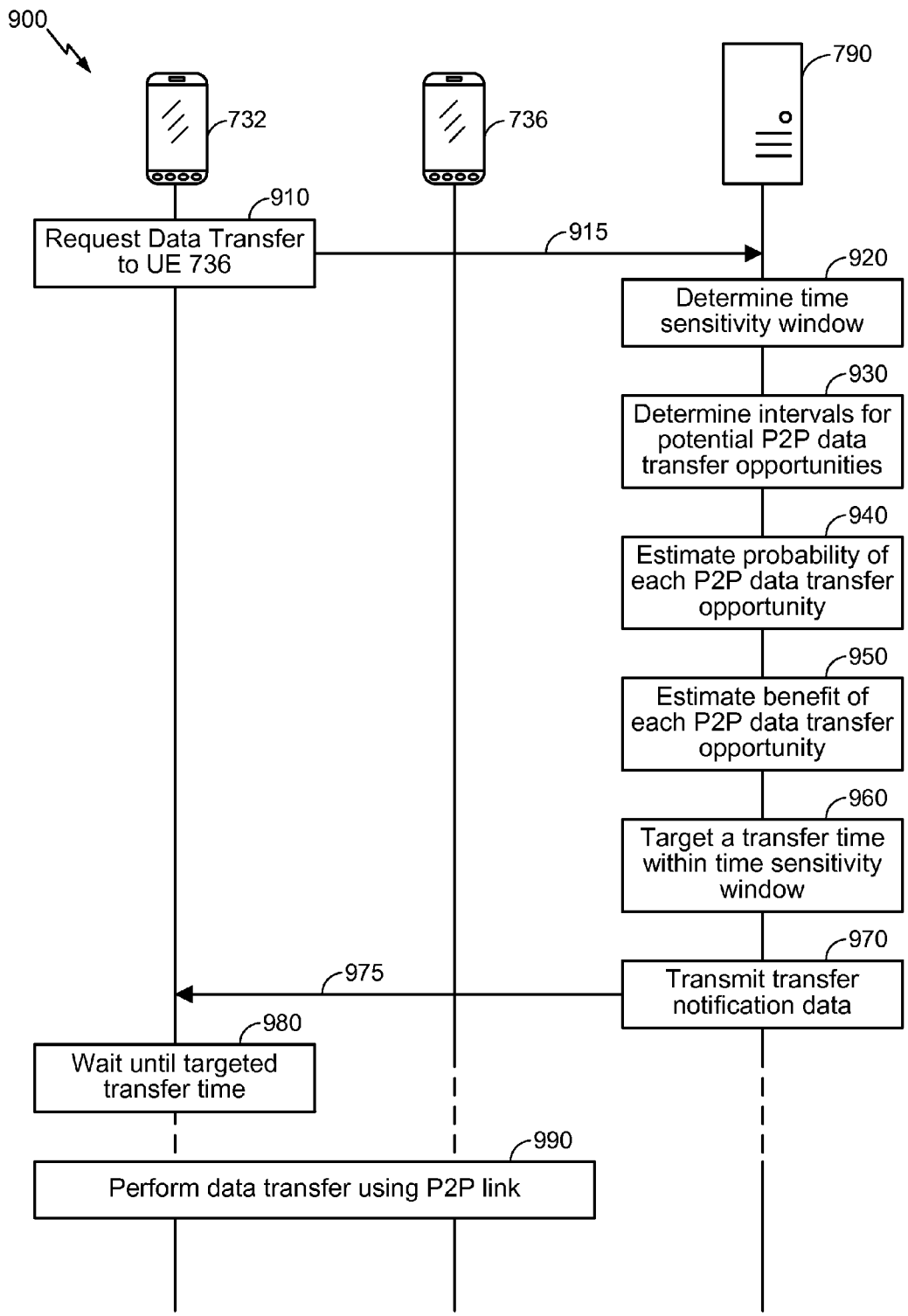
FIG. 9 illustrates a signal flow diagram depicting data transfers in accordance with an aspect of the disclosure.

FIG. 9 generally illustrates a signal flow diagram 900 for optimizing data transfers in accordance with an aspect of the disclosure. For example, the application server 790 may perform a specific implementation of method 800 in the manner depicted in FIG. 9.

At 910, the UE 732 requests a data transfer to UE 736. The data transfer request 915 is transmitted to and received by the application server 790. The data transfer request may be precipitated by one or more events, for example, a user input received at UE 732 comprising an explicit command to transfer data, an application that performs intermittent (e.g., periodic) updating or synchronizing, etc.

The data transfer request 915 may include any of the data set forth in the present disclosure that may be useful for performing the method 800. In one possible scenario (not shown in FIG. 9), an initial data transfer request omits useful data, which is subsequently requested by the application server 790 and supplied, if possible, by the UE 732. In this scenario, the data transfer request 915 comprises an initial data transfer request and one or more successive data transfer requests.

Upon receipt of the data transfer request 915, the application server 790 performs one or more of 920, 930, 940, 950, and 960, which may be initiated, performed and/or completed in any order.

At 920, the application server 790 determines a TSW associated with the data to be transferred. The TSW may be a time to live (TTL) of the data transfer request 915. As noted above, the TSW may begin at the time that the UE 732 requests the data transfer 910, designated as a present time where t=0. Alternatively, present time t=0 may represent the time that the data transfer request 915 is sent or the time that the data transfer request 915 is received. The determined TSW extends to a future end time $T_E$. Accordingly, the TSW may be a continuous interval having a length equal to $T_E$.

In one possible example, the UE 732 explicitly identifies the duration of the TSW or the end time $T_E$. The data transfer request 915 sent by the UE 732 may include a TSW indicator, or the TSW indicator may be sent separately. According to one implementation, the end time $T_E$ may be specified by the user and received at a user input of the UE 732. Additionally or alternatively, the end time $T_E$ may be specified or derived by an application installed on the UE 732. The application may be associated with the data to be transferred, or may be an application specially configured to coordinate data transfers. Additionally or alternatively, the end time $T_E$ may be specified by the operating system installed on the UE 732.

The application server 790 may determine the TSW (at 920) based on the TSW indicator sent by the UE 732. The application server 790 may also modify the TSW indicated by UE 732 based on other factors set forth in the present disclosure. If there is no TSW indicator supplied by the UE 732, then the application server 790 may determine for itself the duration of the TSW or the end time $T_E$ based on, for example, a data type associated with the requested data transfer or an application associated with the requested data transfer. Additionally or alternatively, the application server 790 may rely on historical indicators, for example, previous TSW indicators received from UE 732, previous TSW indicators received from similar UEs, or similarly-situated UEs, previous TSWs determined for the specific data types or application associated with the requested data transfer, previous feedback from UE 732 or similar UEs responsive to previous TSW determinations, etc. The application server 790 may also determine a probabilistic model of the TSW, in which a number of successive potential end times $T_{E1}$, $T_{E2}$, ... $T_{En}$ are determined, wherein each potential end time is associated with a decreasing certainty that the data transfer can still be satisfactorily performed.

At 930, the application server 790 determines one or more intervals within the TSW for potential P2P data transfer opportunities. According to one possible scenario, the entirety of the TSW is divided into non-overlapping intervals such that each interval is distinguished from the preceding interval and the subsequent interval on the basis of the set of P2P data transfer opportunities determined to be available during that interval.

In one possible example, the UE 732 may be determined to have access to UE 736 via link 741 (as depicted in FIG. 7A) during a first interval (beginning at time t=0 and extending to $T_1$). In a second interval (beginning at time $t=T_1$ and extending to $T_E$), the UE 732 may be determined to have access to UE 736 via both of link 742 and P2P link 750 (as depicted in FIG. 7B). In this example, the application server 790 may rely on location prediction using any suitable location-predicting methods. To return to the example of FIG. 7A, the application server 790 may determine that during a first interval, the UE 732 is at a first specific location and that the UE 736 is at a second specific location, wherein the first and second specific locations are not proximate to one another. The determination by the application server 790 that the two specific locations are "not proximate" may be based on the range of a particular P2P technology (for example, BTLE, Wi-Fi Direct, LTE-D, etc.). The application server 790 may also determine that at time $t=T_1$, the UE 732 will have relocated such that UE 732 and UE 736 are proximate, as shown in FIG. 7B. Again, the determination by the application server 790 that the two specific locations are "proximate" may be based on the range of a particular P2P technology. In this example, the application server 790 determines two intervals within the TSW, a first interval in which the UE 732 and UE 736 are not proximate, and a second interval in which they are proximate.

At 940, the application server 790 estimates the probability that a P2P data transfer opportunity will occur. To return to the foregoing example, the application server 790 may estimate the probability of the prediction that UE 732 and UE 736 will be proximate beginning at time $t=T_1$. The probability estimate may be a simple binary determination, for example, a determination based on the available data that the UE 732 and UE 736 will or will not be proximate. Table 2 shows an example of binary determinations made by application server 790.

TABLE 2

Example of Binary Determination of P2P Availability

| Interval (start, end) | Network link (e.g., link 741, link 742) | Direct P2P link (e.g., P2P link 750) |
|---|---|---|
| (0, $T_1$) | Available | Not Available |
| ($T_1$, $T_E$) | Available | Available |

There are multiple ways in which the application server 790 can estimate the probability that a P2P data transfer opportunity will occur. As shown in Table 2, the application server 790 may determine based on, for example, data gathered from one or more exchange servers or calendaring applications, that the UE 732 and UE 736 are both scheduled to be at the same place at the same time beginning at time $t=T_1$.

In one possible implementation, the UE 732 requests a meeting with UE 736 to discuss a proposal. The requested meeting is set for 2:00-3:00 PM at a selected conference room. The meeting request is associated with a video presentation containing a large quantity of data. The video presentation is intended to be viewed by the user of UE 736 during and/or after the meeting. The UE 732 uses one or more exchange servers or calendaring applications to set up the meeting, which is accepted by UE 736. In this implementation, the application server 790 will be able to generate a data table similar to the table depicted in Table 2. The data table is based on the information generated by the one or more exchange servers or calendaring applications, without any additional input by either UE 732 or UE 736. Time $T_1$ may be 2:00 PM, since a P2P data transfer opportunity is likely to occur at that time (given the close proximity of a conference room). Time $T_E$ (which defines the end of the TSW) may be 3:00 PM, since UE 736 may wish to leave the meeting with a copy of the video presentation.

In this implementation, the application server 790 may determine that, by default, large data transfers associated with meetings set up using a specific exchange server or calendaring application can be delayed until the meeting begins, and that the TSW can extend until the end of the scheduled meeting. These default setting may be modified in accordance with feedback from UE 732 or UE 736, or in view of other considerations set forth in the present disclosure.

In the foregoing conference room example, the application server 790 makes a simple distinction between a first interval (0, $T_1$) in which P2P offloading is not possible and a second interval ($T_1$, $T_E$) in which an opportunity for P2P offloading arises. However, it will be understood that more complex distinctions can be made. For example, different P2P technologies may be available across different time intervals. In another implementation of the foregoing conference room example, the application server 790 distinguishes between a direct LTE-D link and a direct BTLE link (which tends to have a shorter range relative to LTE-D). Table 3 shows an example where application server 790 distinguishes between multiple P2P technologies.

TABLE 3

Example of Distinction Between Multiple P2P Technologies

| Interval (start, end) | Network link | Direct LTE-D link | Direct BTLE link |
|---|---|---|---|
| (0, $T_1$) | Available | Not Available | Not Available |
| ($T_1$, $T_2$) | Available | Available | Not Available |
| ($T_2$, $T_E$) | Available | Available | Available |

In this implementation, the application server 790 determines that because BTLE has a range that is approximately limited to the conference room, BTLE will be available at the time that the meeting begins (2:00 PM). On the other hand, since LTE-D has a longer range, the application server 790 may determine that LTE-D will be available beginning fifteen minutes prior to the actual arrival of UE 732 and UE 736 in the selected conference room, for example, when the user of UE 732 predictably arrives on the campus that includes the conference room. As a result, the application server 790 will set $T_1$=1:45 PM and $T_2$=2:00 PM. Accordingly, three intervals will be determined by the application server 790 at 930, each interval being characterized by a different set of available links between UE 732 and UE 736, as shown in Table 3.

One consideration affecting the determinations made by application server 790 is whether UE 732 and UE 736 are equipped to transfer data via direct P2P links. If either of UE 732 or UE 736 is incapable of P2P data transfers, then the application server 790 may forego a number of the operations described herein. Another consideration is whether UE 732 and UE 736 share a single network operator. If UE 732 and UE 736 have different network operators, then it may not be possible to transfer data over, for example, a direct LTE-D link. Information relating to the respective network operators may be stored at the application server 790 or obtained from the devices themselves. For example, the UE 732 and/or the UE 736 may include information relating to a network operator in the data transfer request 915. If the UE 732 and UE 736 do not share a network operator, a direct LTE-D link may still be possible if the network operators have an agreement to enable direct LTE-D links between their respective customers. The application server 790 may, in the same manner as described above, store or obtain information relating to such agreements.

It will be understood that the interval determinations of 930 and probability estimates of 940 may vary as best suited to the circumstances. Consider an implementation in which UE 732 is a smartphone belonging to a particular user, and UE 736 is a tablet that this particular user keeps at his or her home. When data is acquired by either of UE 732 or UE 736, it is automatically synchronized to the other in accordance with a data-synchronizing operation of a particular application. The application assigns an arbitrary synchronization cycle for the data, for example, twelve hours. The synchronization cycle may be considered a TSW by the application server 790. If data is obtained by the UE 732 (the smartphone) while the user is at work, the UE 732 may attempt to synchronize the obtained data with the UE 736 (the home tablet). The application server 790 may determine that at the time of the requested synchronization (t=0), the UE 732 and UE 736 are not proximate, but that at some future time, an opportunity for P2P offloading will arise. The determination that UE 732 and UE 736 are not proximate at time t=0 may be based on, for example, GPS signals or Wi-Fi connection statuses of the respective UEs. The determination may also be made on the basis of historical behavior, for example, a record of past GPS signals or Wi-Fi connection statuses indicating that the UE 736 is always at the user's home, or a record of past GPS signals or Wi-Fi connection statuses indicating that the UE 732 is usually at the user's workplace between approximately 9:00 AM and 5:00 PM on weekdays. According to this implementation, the application server 790 may determine the probability that a Wi-Fi Direct link will arise. For example, the application server 790 may set an arbitrary threshold probability (e.g., 80%) and determine that a direct P2P link will be "available" if it can be predicted with a certainty that exceeds the threshold. Table 4 shows an example where application server 790 determines intervals based on the arbitrary threshold probability that a P2P offloading opportunity will occur.

TABLE 4

Example of Prediction Based on Probability

| Interval (start, end) | Network link | Wi-Fi Direct link |
|---|---|---|
| (0, $T_1$) | Available | Not Available |
| ($T_1$, $T_E$) | Available | Available |

According to the example of Table 4, the application server 790 may determine the time $T_1$ as the time beyond which there is an 80% probability that UE 732 and UE 736 will be proximate. For example, the application server 790 may predict, based on past behavior associated with UE 732 (or predictions from the past that turned out to be accurate), that the probability that a Wi-Fi Direct link will be available before 6:00 PM is less than 80%, and the probability is greater than 80% after 6:00 PM. As a result of this prediction, the application server 790 can set $T_1$ equal to 6:00 PM, thereby determining a first interval in which the Wi-Fi Direct link is not available (ending at 6:00 PM) and a second interval in which the Wi-Fi Direct link is available (beginning at 6:00 PM).

In another possible scenario, the application server 790 may divide (at 930) the TSW into equal intervals, for example, minutes or hours, and predict the respective locations of UE 732 and UE 736 at every interval. For example, the application server 790 may set thirty minute intervals and estimate the probability that the Wi-Fi Direct link will be available for each interval. Table 5 shows an example of this type of prediction.

TABLE 5

Example of Prediction Based on Probability

| Start time of 30 minute interval | Network link probability | Wi-Fi Direct link probability |
|---|---|---|
| 3:30 PM | 90% | 5% |
| ... | ... | ... |
| 5:00 PM | 79% | 15% |
| 5:30 PM | 74% | 66% |
| 6:00 PM | 98% | 80% |
| 6:30 PM | 98% | 87% |
| ... | ... | ... |
| 3:00 AM | 99% | 91% |

These estimated values may be derived from past behavior, navigational applications, Wi-Fi connection statuses, or any other relevant data set forth in the present disclosure. The estimated probabilities shown in Table 5 may be based on the start time of the interval (for example, the application server 790 may estimate that the probability of a Wi-Fi Direct link being available at 5:00 PM is equal to 15%). Alternatively, the application server 790 may compute the probability that a given link will be available for the entire duration of the interval (for example, the application server 790 may estimate that the probability of a Wi-Fi Direct link being available from 5:00 PM to 5:30 PM is equal to 15%).

As noted above, the 30 minute interval length is exemplary and may be adjusted arbitrarily. According to one possible example, the interval length is selected based on the estimated amount of time necessary to complete the requested data transfer. This estimating may be based on factors such as the quantity of data to be transferred, the transfer technologies available, past measurements of data transfer durations, etc. In a specific implementation, the application server 790 may determine that P2P discovery takes a certain fixed amount of time, and that transfer using the P2P technology requires a variable amount of time based on the quantity of data to be transferred. The application server 790 can then compute the likely duration of time within which the requested transfer can be completed. This computed value can replace the arbitrary interval (30 minutes) from the example of Table 5.

Returning to FIG. 9, at 950, the application server 790 estimates the benefit associated with each P2P data transfer opportunity. At 960, the application server 790 targets a transfer time within the TSW. At 970, the application server 790 transmits transfer notification data 975 to the UE 732.

According to one particular implementation, the application server 790 simply assumes (at 950) that it is beneficial to delay the requested data transfer until a P2P data transfer opportunity arises. According to this implementation, the transfer time targeted at 960 would the time at which the P2P data transfer opportunity is predicted to arise. The transfer notification data 975 includes the transfer time targeted at 960. Table 6 is similar to Table 2, except that the application server 790 has indicated a target transfer time in accordance with this implementation.

TABLE 6

Targeted Transfer Time

| Interval (start, end) | link 741, link 742 | P2P link 750 | Target transfer time |
|---|---|---|---|
| $(0, T_1)$ | Available | Not Available | No |
| $(T_1, T_E)$ | Available | Available | Yes |

As shown in Table 6, the targeted transfer time is associated with the second interval $(T_1, T_E)$. This time is targeted because the P2P link 750 is available during the second interval. The transfer notification data 975 may identify the start time of the interval associated with the target transfer time, the end time of the interval associated with the target transfer time, or both.

More complex implementations are possible. Table 7 is similar to Table 3 except that each interval is rank-ordered (in accordance with, for example, the benefits estimated at 950).

TABLE 7

Rank-Ordered Targeted Transfer Time

| Interval (start, end) | link 741, link 742 | LTE-D link | BTLE link | Ranked Target |
|---|---|---|---|---|
| $(0, T_1)$ | Available | Not Available | Not Available | 3 |
| $(T_1, T_2)$ | Available | Available | Not Available | 2 |
| $(T_2, T_E)$ | Available | Available | Available | 1 |

As shown in Table 7, the third interval $(T_2, T_E)$, ranked as '1', is preferred to the second interval $(T_1, T_2)$ and first interval $(0, T_1)$, ranked '2' and '3', respectively. Accordingly, the application server 790 targets a transfer time from the highest ranked interval. The application server 790 may use the benefit estimated at 950 to determine which transfer time will be targeted. Because direct P2P links such as LTE-D and BTLE are beneficial under some circumstances, the second and third intervals (associated with availability of direct P2P links) may be preferred to the first interval (in which no direct P2P links are available). Moreover, the application server 790 may also estimate that the benefits of BTLE are high, under some circumstances, relative to LTE-D. As a result, the third interval (associated with availability of BTLE) is preferred to the second interval (associated with availability of LTE-D). The application server 790 may also prefer the third interval because multiple direct P2P link are possible (both LTE-D and BTLE), whereas during the second interval, only one direct P2P link is possible (LTE-D alone). These considerations may outweigh other factors, for example, a general preference for earlier performance of the data transfer. The transfer notification data 975 may include all of the data in Table 7, any portion thereof, and/or any data used to generate Table 7.

The application server 790 may determine which transfer time will be targeted in any suitable manner. According to one possible implementation, the application server 790 assigns each interval a preference score, and the target transfer time is determined based on the interval that has the highest preference score. The preference score may depend on a number of factors. The number of factors may be weighted arbitrarily.

According to one possible implementation, the preference score P for each interval may depend on three factors: a time preference factor, a network offloading factor, and a power savings factor.

The first interval may rate highly based on the time preference factor, since immediacy is generally preferred to delay. Accordingly, the second interval and third interval would each rate lower based on the time preference factor. For the purposes of illustration, the preference score for the first interval (P1) may be increased by a value of '1' based on the time preference factor, whereas the preference scores for the second and third intervals (P2 and P3, respectively) would not be increased.

The second and third intervals may rate highly based on the network offloading factor, since direct P2P links are predicted to be available during the second and third intervals. Accordingly, the first interval would rate lower since a data transfer performed during the first interval will increase network loading. For the purposes of illustration, the preference score for the second and third intervals (P2 and P3, respectively) may each be increased by a value of '1', whereas the preference score for the first interval (P1) would not be increased.

The third interval may rate highly based on the power savings factor because direct BTLE links consume less power than network links (used during the first interval) and direct LTE-D links (used during the second interval). For the purposes of illustration, the preference score for the third interval (P3) may be increased by a value of '1', whereas the preference score for the first and second intervals (P1 and P2, respectively) would not be increased.

Based on each of these three factors, the application server 790 may generate a preference score for the first interval (P1), a preference score for the second intervals (P2), and a preference score for the third intervals (P3). The total preference score may include the sum of the value increases associated with each factor. According to the foregoing illustrations, the preference score for the first interval P1 would equal '1' (the sum of '1' for the time preference factor, '0' for the network offloading factor, and '0' for the power savings factor). The preference score for the second interval P2 would equal '1' (the sum of '0' for the time preference factor, '1' for the network offloading factor, and '0' for the power savings factor). The preference score for the third interval P3 would equal '2' (the sum of '0' for the time preference factor, '1' for the network offloading factor, and '1' for the power savings factor). In this illustration, the third interval would be targeted because the preference score for the third interval (P3) is greater than the preference scores for the first and second intervals (P1 and P2, respectively).

The application server 790 may use proportional scores as well. For example, the time preference factor may be inversely proportion to the delay associated with performing a data transfer at a given interval. In other words, the greater the delay associated with a particular interval, the more the time preference factor decreases in value. For example, if the second interval is associated with a delay of 9 hours relative to the first interval, and the third interval is associated with a delay of 10 hours relative to the first interval, then the time preference factor for each interval may be '1', '0.1', and '0.0', respectively.

The power savings factor may be inversely proportional to a typical or estimated power cost associated with a particular interval. For example, if a data transfer performed during the first interval will consume twice as much power as a data transfer performed during the third interval, then the power savings factor for the first and third intervals may be '0.5' and '1', respectively. In order to perform a power savings estimate, the application server 790 may use data such as transfer power measurements performed by UE 732 or UE 736, the quantity of data to be transferred during the interval, the technology available during the interval, the proximity of the UE 732 to the UE 736 during the interval, historical data relating to any of the above, or any other available data that relates to an estimation of the power cost of completing the requested data transfer.

Finally, the application server 790 may weight each factor. For example, the application server 790 may be configured to give greater weight to the network offloading factor. Additionally or alternatively, the user of UE 732 may give greater weight to the time preference factor. The weight for each factor may be a simple coefficient, such that the preference score P for a given time interval is equal to $w_1f_1+w_2f_2+w_3f_3$, wherein $f_1$, $f_2$, and $f_3$ are the three factors described in the foregoing example, and $w_1$, $w_2$, and $w_3$ are the weights given to each factor. Consider a previous example, in which UE 732, a smartphone associated with a particular person, synchronizes data with UE 736, a tablet typically kept in the person's home. In this instance, the data transfer may have relatively little urgency, since the data need not be synchronized immediately. In this example, the home tablet will not be used while the user is at work, and therefore, there is no need for immediate synchronization of the data. Accordingly, the weight $w_1$ associated with time preference factor $f_1$ will be low.

The weights may be static or dynamic. For example, the weight $w_3$ associated with the power savings factor $f_3$ may be low when a battery life associated with the UE 732 is high and/or increasing, and high when the battery life is low and/or decreasing.

A performance score may be based on any number of factors. Each of the factors may be weighted, un-weighted, adjustably weighted, etc. One additional factor may be a processing power factor, similar to the power savings factor described above. Generally, if the application server 790 determines that a specific data transfer technology is associated with low processor usage rates, then an interval associated with that specific data transfer technology may have a high value for the processing power factor, and the preference score P for the interval will rise. On the other hand, data transfer technologies associated with high processor usage rates will have a low value for the processing power factor, and the preference score P will not rise appreciably. Like the power savings factor, the processing power factor may be associated with a weight that changes based on circumstances experienced at one or more of the UE 732 or the UE 736. For example, if processor usage at the UE 732 is critically high or increasing, then the weight associated with the processing power factor may be increased to reflect the fact that reducing processor usage is a high priority. On the other hand, if processor usage is low, then the weight may be decreased to reflect that there is no shortage of processing power available to perform the data transfer.

As noted above, P2P offloading can be beneficial to network providers since P2P offloading reduces the network load experienced by the network. Moreover, there may be costs borne by the user of the UE 732 or the UE 736 that directly relate to network usage. The weight for the network offloading factor, described above, may be high if the immediately-available network links were scarce or costly, and the weight may be low if network resources are readily available. The availability of network resources may be determined based on data obtained from UE 732, UE 736, or the network infrastructure associated with either.

Another factor may be a performance probability factor. As noted above, the application server 790 may rely on predictions of future locations in order to identify P2P offloading opportunities. In many cases, present location may be associated with a high level of certainty relative to future locations. Accordingly, the performance probability factor is likely to be high for the first interval, and relatively lower for future intervals, depending on the degree of certainty with which the P2P offloading opportunity is predicted. If there is significant uncertainty about the probability that a P2P offloading opportunity will arise during a future interval, then the preference score for the future interval may not increase as much as it might if the P2P offloading opportunity were more certain.

Another consideration that relates to the performance probability factor is a probability of fully completing the data transfer. For example, the application server 790 may determine intervals for P2P data transfer opportunities using data obtained from navigational applications operating on each of UE 732 and UE 736. The data may indicate that the UE 732 and UE 736 will be on the same road, traveling at high speeds in opposite directions. In this scenario, the application server 790 may be able to predict with high certainty (for example, 90%), that UE 732 and UE 736 will be close enough to one another for a direct P2P link (for example, an LTE-D connection) for a certain future interval. However, the application server 790 may also determine that the length of time it will take to transfer the data is likely to exceed the duration of the future interval. The application server 790 makes this determination by comparing the estimated amount of transfer time to the estimated length of the future transfer interval. In other words, the application server 790 may compare the two values and determine that the amount of time that UE 732 and UE 736 will be able to maintain the direct P2P link will not be long enough to complete the requested data transfer. The performance probability factor may therefore be lowered to reflect the fact that the duration of the interval is insufficient for complete performance of the data transfer (because the direct P2P link will not be maintained long enough). This comparison may be of special importance if the interval under consideration is the last interval in the TSW (or close to the last interval).

For example, a direct Wi-Fi link (which include, for example, a handshake) can take a significant amount of time to set up. As a result, there may not be enough time to complete a data transfer within the interval associated with the direct Wi-Fi link. Accordingly, the performance probability factor may be relatively lower for direct Wi-Fi links than for other P2P technologies. Additionally or alternatively, the application server 790 may (at 930) determine interval lengths differently for each P2P technology based on set-up time. According to this alternative, the time that a P2P data transfer opportunity is determined to be "available" (i.e., the beginning of a given interval) is not the time that UE 732 and UE 736 are within a given proximity to one another, but more practically, the time that UE 732 and UE 736 are within a given proximity plus the time that will elapse while the direct P2P link is established.

At 970, as noted above, the application server 790 will transmit transfer notification data 975. As noted above, the transfer notification data 975 may include, for example, a command to transmit the data at the transfer time targeted at 960.

According to one implementation, shown in FIG. 9, the target transfer time is a future time, and the data transfer is performed using a direct P2P link. At 980, the UE 732 waits until the targeted transfer time. At 990, the data transfer is performed using a P2P link (at 990). The targeted transfer time may be identified in relative or absolute terms. In other implementations, the target transfer time may be a present time, and the transfer may begin immediately using whatever data transfer resources are available.

In other implementations, the transfer notification data 975 includes not only an identification of the targeted transfer time, but also an identification of the transfer technology to be used. For example, the transfer notification data 975 may command the UE 732 to begin the data transfer in one hour using a direct LTE-D link. The transfer notification data 975 may further include information relating to establishment of the direct LTE-D link, discovery of the data transfer target (for example, UE 736), etc.

In other implementations, the transfer notification data 975 includes instructions to prompt the user to delay the data transfer until the targeted transfer time, or to notify the user of the targeted transfer time. In other words, the application server 790 will obtain the user's permission before delaying the data transfer, or notify the user of the targeted transfer time, giving the user an opportunity to override the delay or make a new request.

In other implementations, the transfer notification data 975 includes other data generated by application server 790 in accordance the present disclosure. For example, if the application server 790 has estimated a power savings value for associated with a future transfer time, then the power savings value may be included in the transfer notification data 975. In this example, the user of UE 732 is alerted to the power savings associated with the data transfer delay.

In other implementations, the transfer notification data 975 may include content indicators. Content indicators may describe the data to the user, for example, a file name, a thumbnail image, a snippet of video, a front page or title of a document, or any other indicator of the content of the data to be transferred. Additionally or alternatively, the transfer notification data 975 merely identifies the data to be transferred and the UE 732 generates the content indicators locally.

In other implementations, the transfer notification data 975 may include conditional transfer times and associated conditions. For example, the application server 790 may instruct the UE 732 to perform periodic location updates using, for example, a navigational application, and to begin a data transfer when the coordinates of the UE 732 meet certain conditions.

The application server 790 may also treat data which can be segmented differently from data that can not be segmented. For example, some video data files must be transferred in their entirety before they can be used. Others can be segmented (for example, streamed) such that the beginning of the video can be viewed by a transferee (for example, UE 736) before the data associated with the end of the video is even received. Consider a scenario in which UE 732 requests immediate transfer of a two hour video to UE 736, and the application server 790, upon receiving the request, determines that a P2P offloading opportunity is likely to arise within 40 minutes. If the two hour video can not be segmented, then the application server 790 may grant the request for immediate transfer. On the other hand, if the two hour video can be segmented, then the application server 790 may instruct the UE 732 to immediately transfer an amount of data that equates to approximately the first 40 minutes of the two hour video. Then, the application server 790 may target a future interval, in which the P2P offloading opportunity is available, for transfer of the remaining data. As a result, the remaining one hour and twenty minutes can be transferred while realizing power savings, network load reduction, etc., without limiting usage of the data on the part of the UE 736. According to some implementations, the application server 790 may determine whether the data that is subject to the data transfer request can be segmented in this manner. This determination may be made based on, for example, data received from the UE 732 which is included in the data transfer request 915.

Figure 10:
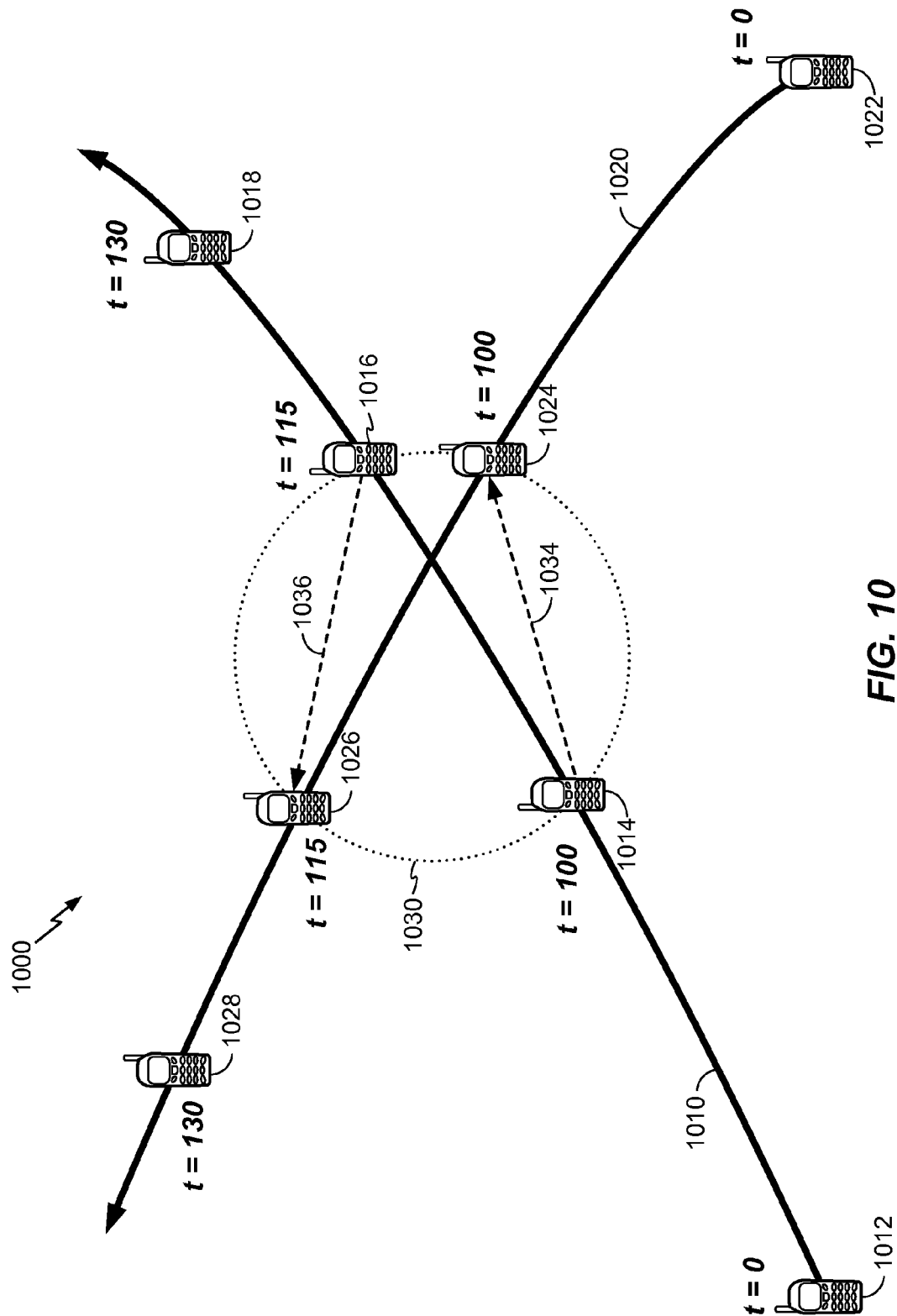
FIG. 10 illustrates an example of opportunistic, location-predictive P2P offloading techniques.

FIG. 10 generally illustrates an example of opportunistic, location-predictive P2P offloading techniques. In the wireless communication system 1000 of FIG. 10, a wireless device travels on a first trajectory 1010 and a data transfer target travels on a second trajectory 1020. The wireless device traveling on the first trajectory 1010 may be analogous to the UE 732 disclosed in FIG. 7A, FIG. 7B, and FIG. 9, and the data transfer target traveling on the second trajectory 1020 may be analogous to the UE 736 disclosed in FIG. 7A, FIG. 7B, and FIG. 9.

According to this example, the wireless device traveling on the first trajectory 1010 is shown in four different positions along the first trajectory 1010. Each position corresponds to a different time. At time t=0, the wireless device is shown at position 1012. At time t=100, the wireless device is shown at position 1014. At time t=115, the wireless device is shown at position 1016. And at time t=130, the wireless device is shown at position 1018. The data transfer target traveling on the second trajectory 1020 is also shown in four different positions at four different times along the second trajectory 1020. At time t=0, the data transfer target is shown at position 1022. At time t=100, the data transfer target is shown at position 1024. At time t=115, the data transfer target is shown at position 1026. And at time t=130, the data transfer target is shown at position 1028. The unit of time may be, for example, minutes.

In the example of FIG. 10, the wireless device determines to transfer data to the data transfer target. Accordingly, the wireless device sends a data transfer request to, for example, application server 790. The application server 790 then determines the TSW associated with the data transfer request in any manner set forth in the present disclosure. For the purposes of this example, the data request has a TTL of 130 minutes. Therefore, the length of the TSW is set equal to 130 minutes, starting at time t=0.

Next, the application server 790 determines intervals for potential P2P data transfer opportunities between the wireless device and the data transfer target. The application server 790 determines the intervals on the basis of relevant factors such as the length of the TSW, the predicted locations of the wireless device and data transfer target, the P2P technologies that will be available at the predicted locations, and the amount of data to be transferred (for example, the file size).

In this illustration, the application server 790 initially determines the TSW. Then, the application server 790 will predict the respective locations of the wireless device and the data transfer target at various times during the TSW. As shown in FIG. 10, the application server 790 predicts (based on, for example, data acquired from a navigational application) that the wireless device will be traveling along the first trajectory 1010 during the 130 minute TSW, and that the data transfer target will be traveling along the second trajectory 1020 during the 130 minute TSW.

Next, the application server 790 determines what P2P technologies will be available for the requested data transfer. For the purposes of this example, the application server 790 determines that LTE-D P2P technology is available to both the wireless device and the data transfer target for the entire duration of the 130 minute TSW. The application server 790 also determines the range of the P2P technology, i.e., the maximum distance over which a direct P2P link can be established. The determined range may be a baseline or default range associated with a particular technology (for example, one mile in the case of LTE-D), or may be adjusted based on conditions, past behavior, etc.

Based on the predicted first trajectory 1010, the predicted second trajectory 1020, and the known or estimated range associated with the available P2P technologies, the application server 790 can determine an available interval for P2P data offloading. In FIG. 10, this interval is depicted as a P2P data transfer zone 1030. The P2P data transfer zone 1030 may be defined as a time interval or geographic area in which a P2P data transfer can be performed.

In the example of FIG. 10, the application server 790 determines that at time t=100, the wireless device traveling along the first trajectory 1010 will be at position 1014, and the data transfer target traveling along the second trajectory 1020 will be at position 1024. Moreover, the distance between position 1014 of the wireless device and position 1024 of the data transfer target is equal to the maximum distance over which a direct P2P link can be established (one mile for LTE-D in this illustration). Therefore, the application server 790 predicts, based on the predicted first trajectory 1010, the predicted second trajectory 1020, and the predicted availability of LTE-D P2P technology having a known or estimated range, that a direct LTE-D link 1034 can be established between the wireless device and the data transfer target at time t=100.

Using the same techniques, the application server 790 further predicts that P2P data transfer will remain available until time t=115, at which point the direct LTE-D link 1036 is once again at the limit of its range. Finally, the application server 790 predicts that between time t=115 and t=130 (the end of the TSW), the distance between the wireless device and the data transfer target will be too great for establishment or maintenance of a direct LTE-D link.

Accordingly, it will be understood that the application server 790 is able to determine an interval for P2P offloading as a function of the predicted locations of the wireless device and data transfer target, respectively, as well as the known or estimated range of the available P2P technologies. The application server 790 may therefore target a transfer time of t=100.

However, the application server 790 may also determine the amount of time necessary to complete the requested data transfer. The application server 790 will be able to make this determination as a function of the amount of data to be transferred and a data transfer rate. The data transfer rate may be a baseline or default data transfer rate that is assumed based on the available P2P technology. Additionally or alternatively, the application server 790 may estimate a data rate based on conditions, past behavior, etc. The application server 790 may assume a constant data rate throughout the P2P offloading interval, or may estimate a changing data rate based on the predicted locations (and distance therebetween) of the wireless device and data transfer target, respectively.

In this scenario, the ultimate decision to target a transfer time of t=100 may be contingent upon a determination (by, for example, the application server 790) that the requested data transfer can be completed in less than 15 minutes. In particular, because the interval for P2P offloading has been predicted to begin at time t=100 and end at time t=115, the application server 790 predicts that the P2P offloading interval lasts 15 minutes. Accordingly, if the application server 790 determines that the data transfer can be completed within 15 minutes, then the application server 790 will target a transfer time of t=100. If, on the other hand, the data transfer can not be completed within the 15 minute P2P offloading interval, then the application server 790 may target a different transfer time (for example, time t=0).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for a server to optimize data transfers, comprising:
   receiving a request to transfer data between a wireless device and a data transfer target, wherein the requested data transfer is associated with a time sensitivity window (TSW);
   determining whether an opportunity for a peer-to-peer (P2P) data transfer will arise during the TSW;
   targeting a transfer time from within the TSW for performing the requested data transfer based on the opportunity determination; and
   transmitting transfer notification data, wherein the transfer notification data includes the targeted transfer time.

2. The method of claim 1, wherein the TSW comprises:
   a present time; and
   an end time before which the requested data transfer must be performed.

3. The method of claim 1, further comprising:
   determining the TSW based on (i) a TSW indicator received from the wireless device, (ii) a data type associated with the requested data transfer, (iii) an application associated with the data or the request, (iv) a previous determination of a previous TSW, or (v) any combination of (i) through (iv).

4. The method of claim 1, wherein determining whether an opportunity for a peer-to-peer (P2P) data transfer will arise during the TSW comprises:
   predicting the respective locations of the wireless device and the data transfer target at a future time within the TSW; and
   determining whether the wireless device and the data transfer target can establish a direct P2P link at the future time.

5. The method of claim 4, wherein predicting the respective locations of the wireless device and the data transfer target is based on (i) navigational data, (ii) exchange server data, (iii) social media data, (iv) application data, (v) an accurate prediction made in the past, or (vi) any combination of (i) through (v).

6. The method of claim 4, wherein determining whether the wireless device and the data transfer target can establish a direct P2P link comprises:
   estimating an amount of time it will take to perform the requested data transfer based on a quantity of data associated with the requested data transfer and a P2P technology associated with the direct P2P link;
   estimating a future interval beginning at the future time during which the established direct P2P link can be maintained, based on the predicted respective locations of the wireless device and the data transfer target; and
   comparing the amount of time to a length of the estimated future interval.

7. The method of claim 1, wherein targeting a transfer time comprises targeting a present time as the transfer time based on a determination that an opportunity for a P2P data transfer will not arise during the TSW.

8. The method of claim 1, wherein targeting a transfer time comprises targeting a future time within the TSW as the transfer time based on a determination that an opportunity for a P2P data transfer will arise at the future time.

9. The method of claim 1, wherein targeting the transfer time comprises:
   estimating benefits associated with immediate performance of the requested data transfer at a present time;
   estimating benefits associated with future performance of the requested data transfer until a future time within the TSW, wherein the future time is determined to be an opportunity for a P2P data transfer;
   comparing the estimated benefits associated with immediate performance to the estimated benefits associated with future performance; and
   targeting either the present time or the future time as the transfer time based on the comparison.

10. The method of claim 9, wherein the estimated benefits associated with future performance are increased based on (i) earlier performance of the requested data transfer, (ii) greater reduction in network load, (iii) lower estimated power costs based on a quantity of data to be transferred and a particular P2P technology associated with the P2P data transfer, (iv) lower estimated processing costs based on a quantity of data to be transferred and a particular P2P technology associated with the P2P data transfer, (v) greater certainty that the opportunity for the P2P data transfer will arise, (vi) greater certainty that the requested data transfer can be completed during the opportunity for the P2P data transfer, or (vii) any combination of (i) through (vi).

11. A server for optimizing data transfers, comprising:
   a processor configured to:
      receive a request to transfer data between a wireless device and a data transfer target, wherein the requested data transfer is associated with a time sensitivity window (TSW);
      determine whether an opportunity for a peer-to-peer (P2P) data transfer will arise during the TSW;
      target a transfer time from within the TSW for performing the requested data transfer based on the opportunity determination; and transmit transfer notification data to the wireless device, wherein the transfer notification data includes the targeted transfer time; and
a memory, coupled to the processor, to store related data and instructions.

12. The server of claim 11, wherein the TSW comprises:
a present time; and
an end time before which the requested data transfer must be performed.

13. The server of claim 11, wherein the processor is further configured to:
determine the TSW based on (i) a TSW indicator received from the wireless device, (ii) a data type associated with the requested data transfer, (iii) an application associated with the data or the request, (iv) a previous determination of a previous TSW, or (v) any combination of (i) through (iv).

14. The server of claim 11, wherein to determine whether an opportunity for a peer-to-peer (P2P) data transfer will arise during the TSW, the processor is configured to:
predict the respective locations of the wireless device and the data transfer target at a future time within the TSW;
determine whether the wireless device and the data transfer target can establish a direct P2P link at the future time.

15. The server of claim 14, wherein the processor is configured to predict the respective locations of the wireless device and the data transfer target based on (i) navigational data, (ii) exchange server data, (iii) social media data, (iv) application data, (v) an accurate prediction made in the past, or (vi) any combination of (i) through (v).

16. The server of claim 14, wherein to determine whether the wireless device and the data transfer target can establish a direct P2P link, the processor is further configured to:
estimate an amount of time it will take to perform the requested data transfer based on a quantity of data associated with the requested data transfer and a P2P technology associated with the direct P2P link;
estimate a future interval beginning at the future time during which the established direct P2P link can be maintained, based on the predicted respective locations of the wireless device and the data transfer target; and
compare the amount of time to a length of the estimated future interval.

17. The server of claim 11, wherein to target a transfer time, the processor is further configured to target a present time as the transfer time based on a determination that an opportunity for a P2P data transfer will not arise during the TSW.

18. The server of claim 11, wherein to target a transfer time, the processor is further configured to target a future time within the TSW as the transfer time based on a determination that an opportunity for a P2P data transfer will arise at the future time.

19. The server of claim 11, wherein to target a transfer time, the processor is further configured to:
estimate benefits associated with immediate performance of the requested data transfer at a present time;
estimate benefits associated with future performance of the requested data transfer until a future time within the TSW, wherein the future time is determined to be an opportunity for a P2P data transfer;
compare the estimated benefits associated with immediate performance to the estimated benefits associated with future performance; and
target either the present time or the future time as the transfer time based on the comparison.

20. The server of claim 19, wherein the processor is configured to estimate benefits associated with future performance based on (i) earlier performance of the requested data transfer, (ii) greater reduction in network load, (iii) lower estimated power costs based on a quantity of data to be transferred and a particular P2P technology associated with the P2P data transfer, (iv) lower estimated processing costs based on a quantity of data to be transferred and a particular P2P technology associated with the P2P data transfer, (v) greater certainty that the opportunity for the P2P data transfer will arise, (vi) greater certainty that the requested data transfer can be completed during the opportunity for the P2P data transfer, or (vii) any combination of (i) through (vi).

21. An apparatus for optimizing data transfers, comprising:
means for receiving a request to transfer data between a wireless device and a data transfer target, wherein the requested data transfer is associated with a time sensitivity window (TSW);
means for determining whether an opportunity for a peer-to-peer (P2P) data transfer will arise during the TSW;
means for targeting a transfer time from within the TSW for performing the requested data transfer based on the opportunity determination; and
means for transmitting transfer notification data to the wireless device, wherein the transfer notification data includes the targeted transfer time.

22. The apparatus of claim 21, wherein means for determining whether an opportunity for a peer-to-peer (P2P) data transfer will arise during the TSW comprises:
means for predicting the respective locations of the wireless device and the data transfer target at a future time within the TSW; and
means for determining whether the wireless device and the data transfer target can establish a direct P2P link at the future time.

23. The apparatus of claim 22, wherein means for determining whether the wireless device and the data transfer target can establish a direct P2P link comprises:
means for estimating an amount of time it will take to perform the requested data transfer based on a quantity of data associated with the requested data transfer and a P2P technology associated with the direct P2P link;
means for estimating a future interval beginning at the future time during which the established direct P2P link can be maintained, based on the predicted respective locations of the wireless device and the data transfer target; and
means for comparing the amount of time to a length of the estimated future interval.

24. The apparatus of claim 21, wherein means for targeting a transfer time comprises means for targeting a future time within the TSW as the transfer time based on a determination that an opportunity for a P2P data transfer will arise at the future time.

25. The apparatus of claim 21, wherein means for targeting the transfer time comprises:
means for estimating benefits associated with immediate performance of the requested data transfer at a present time;
means for estimating benefits associated with future performance of the requested data transfer until a future time within the TSW, wherein the future time is determined to be an opportunity for a P2P data transfer;

means for comparing the estimated benefits associated with immediate performance to the estimated benefits associated with future performance; and means for targeting either the present time or the future time as the transfer time based on the comparison.

26. A non-transitory computer-readable medium comprising code, which, when executed by a processor, causes the processor to perform operations for optimizing data transfers, the non-transitory computer-readable medium comprising:

code for receiving a request to transfer data between a wireless device and a data transfer target, wherein the requested data transfer is associated with a time sensitivity window (TSW);

code for determining whether an opportunity for a peer-to-peer (P2P) data transfer will arise during the TSW;

code for targeting a transfer time from within the TSW for performing the requested data transfer based on the opportunity determination; and code for transmitting transfer notification data to the wireless device, wherein the transfer notification data includes the targeted transfer time.

27. The apparatus of claim 26, wherein code for determining whether an opportunity for a peer-to-peer (P2P) data transfer will arise during the TSW comprises:

code for predicting the respective locations of the wireless device and the data transfer target at a future time within the TSW; and code for determining whether the wireless device and the data transfer target can establish a direct P2P link at the future time.

28. The apparatus of claim 27, wherein code for determining whether the wireless device and the data transfer target can establish a direct P2P link comprises:

code for estimating an amount of time it will take to perform the requested data transfer based on a quantity of data associated with the requested data transfer and a P2P technology associated with the direct P2P link;

code for estimating a future interval beginning at the future time during which the established direct P2P link can be maintained, based on the predicted respective locations of the wireless device and the data transfer target; and code for comparing the amount of time to a length of the estimated future interval.

29. The apparatus of claim 26, wherein code for targeting a transfer time comprises code for targeting a future time within the TSW as the transfer time based on a determination that an opportunity for a P2P data transfer will arise at the future time.

30. The apparatus of claim 26, wherein code for targeting the transfer time comprises:

code for estimating benefits associated with immediate performance of the requested data transfer at a present time;

code for estimating benefits associated with future performance of the requested data transfer until a future time within the TSW, wherein the future time is determined to be an opportunity for a P2P data transfer;

code for comparing the estimated benefits associated with immediate performance to the estimated benefits associated with future performance; and code for targeting either the present time or the future time as the transfer time based on the comparison.

* * * * *